Jan. 4, 1949. S. NEWBURGER 2,458,190
POPCORN WARMING DEVICE
Filed Dec. 20, 1947
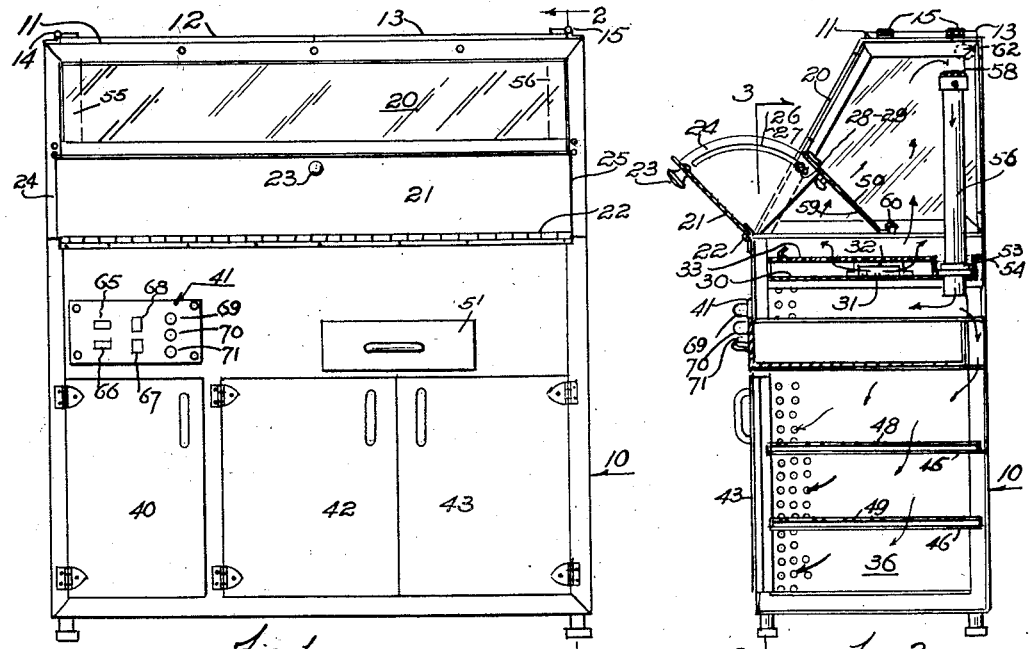
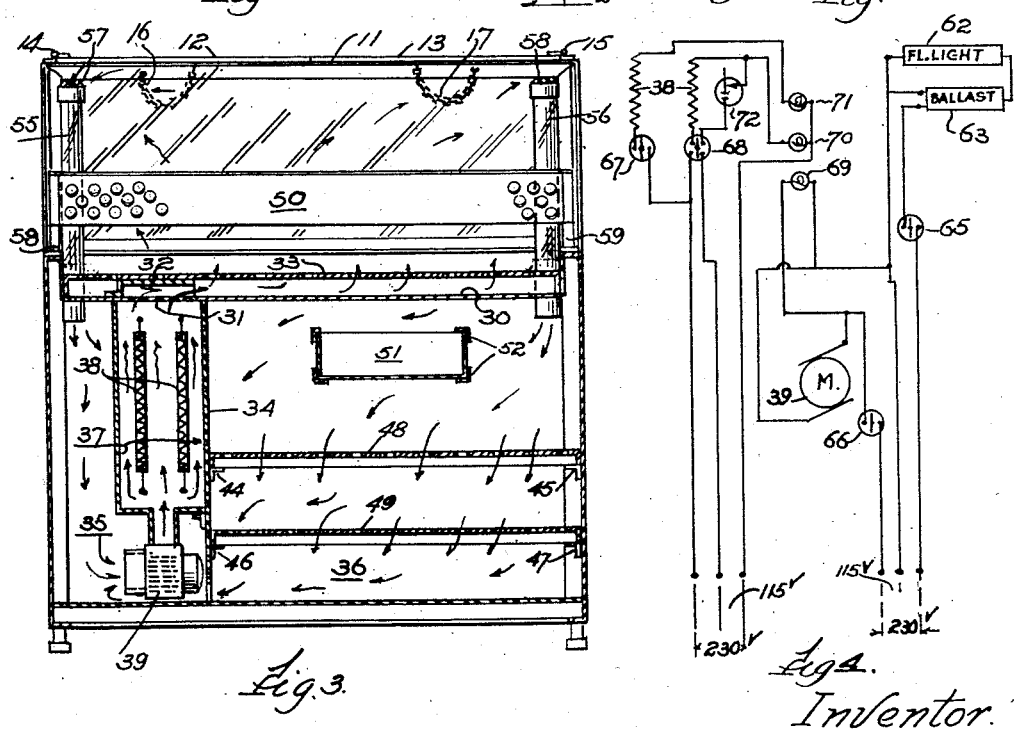
Inventor.
Samuel Newburger.
by McKinley and Comstock
Attorneys.

Patented Jan. 4, 1949

2,458,190

UNITED STATES PATENT OFFICE 2,458,190

POPCORN WARMING DEVICE

Samuel Newburger, Chicago, Ill.

Application December 20, 1947, Serial No. 792,949

2 Claims. (Cl. 219—19)

My invention relates to a device for heating and serving popcorn in theaters, auditoriums, ball parks and other places of public assembly.

Among the objects of my invention is to provide a device capable of handling, heating and dispensing to the public large quantities of popcorn in an appetizing and appealing manner. In the past, theaters and other places of public assembly have been provided with devices which cooked popcorn and then served it to the public. These devices have proved unsatisfactory because the cooking operation requires the services of an operator who is skilled in the use of the machine. This operator must devote a great deal of time to cooking, and if large quantities of popcorn are handled, a second employee is necessary to dispense the popcorn to the public. Such devices are capable of preparing only small quantities of popcorn at a time and they have no means for keeping the popcorn warm, except the heat which radiates from the open flame which is used in the cooking operation. This flame is a fire hazard, which is condemned by many fire regulations, and which is particularly unsafe in theaters and other places where large numbers of people are gathered in a small space.

It is among the objects of my invention to provide a popcorn warming device which presents no fire hazard, which may be handled by an unskilled operator and which is capable of dispensing to the public large quantities of appetizingly warm popcorn. In using my device, the popcorn is first cooked in large quantities away from public view at a warehouse or other suitable establishment. In this manner, the cooking operation can be handled economically and expeditiously by persons skilled in the art. The popcorn is then sent to the theaters or other places of public assembly in large bags. Sufficient popcorn is thus available at all times to meet the demands of the public.

The bags of pre-cooked popcorn are emptied into the top of my popcorn warming device, where the popcorn is subjected to electrically heated air, which is constantly circulated through my device. When the popcorn is warm, it is placed in boxes and stored in trays in my device. These trays are likewise constantly subjected to circulating drafts of electrically heated air.

My device enables a theater, or other place of public assembly, to dispense to the public large quantities of boxed popcorn, all of which is warm and appetizing. It requires only the services of an unskilled dispenser to fill the boxes and vend them to the public.

My invention also comprises such other objects, advantages and capabilities as will later more fully appear, and which are inherently possessed by my invention.

While I have shown in the accompanying drawing a preferred embodiment of my invention, yet it is understood that the same is susceptible of modification and change without departing from the spirit of my invention.

Referring to the drawings, Fig. 1 is a front elevational view of my device facing the user; Fig. 2 is a detailed sectional view on line 2—2 of Fig. 1; Fig. 3 is a detailed sectional view on line 3—3 of Fig. 2 with perforations enlarged, and Fig. 4 is a schematic circuit diagram of my device.

A preferred embodiment of my invention comprises a cabinet 10, which contains all of the component parts of my popcorn warming device. The outside of cabinet 10 presents an appearance which is attractive to the public. My device may be positioned at any convenient place in the lobby of a theater, beneath the stands of a stadium or at any other suitable place, either alone or in conjunction with facilities for dispensing other foods or confections.

The upper portion of cabinet 10, including the top and the upper portions of all four sides, comprise a showcase formed of glass or transparent plastic through which popcorn is visible to the public. The sight of the popcorn attracts the attention of passersby and whets their appetites with the suggestion of an attractive and appetizing repast.

The top 11 of cabinet 10 is split at the center forming two cover halves 12 and 13. Cover halves 12 and 13 are attached at their outer ends to cabinet 10 by pairs of hinges 14 and 15. The inner ends of cover halves 12 and 13 fit against each other by friction grip to form a heat retaining seal for cabinet 10. Chains 16 and 17 are attached at one end to cover halves 12 and 13 respectively, and at the other end to cabinet 10, and are of such a length as to permit the cover half to be raised to an angle slightly beyond upright position, thus assuring the replacement of the cover half to its proper position.

On the side of cabinet 10 which faces the operator, the upper portion of cabinet 10 is slanted at approximately a forty-five degree angle to form a transparent upper section 20 and an opaque metallic lower portion 21. Lower portion 21 is attached at its bottom edge to cabinet 10 by a hinge 22, which is continuous along its bottom edge. Attached to the ends of lower portion 21 are triangular end sections 24 and 25, which have arc shaped cut out portions 26 and 27. Attached to cabinet 10 are a pair of stop members 28 and 29, which extend into cut out portions 26 and 27. At the center of lower portion 21 is a hand knob 23. In operating my device, the user may grasp hand knob 23 and pull outwardly, causing lower portion 21 to pivot outwardly on hinge 22 until the ends of cut out portions 26 and 27 contact stop members 28 and 29 and prevent further movement. In this position, as shown in Fig. 2, access is provided to the interior of cabinet 10.

Permanently mounted in cabinet 10 and attached thereto at a level slightly below the bottom of the transparent portion of cabinet 10 is a rectangular metal platform 30. Platform 30 is dish-shaped, with a rectangular ridge around its edges. Platform 30 has a small square opening 31, over which is mounted a cover 32. Cover 32 blocks opening 31 except for an air vent at one end. Removably mounted on platform 30 is a popcorn tray 33, which is provided with a plurality of small openings or perforations. These perforations are large enough to permit air to pass through, but small enough to prevent the passage of kernels of popcorn.

The lower portion of cabinet 10 is divided into two sections by a metal plate 34, which separates the lower portion of cabinet 10 into a blower compartment 35 and a storage compartment 36. Metal plate 34 is provided with a plurality of perforations, which permit the passage of air from storage compartment 36 into blower compartment 35.

Attached to metal plate 34 is a blower shaft 37, which leads downwardly from opening 31 in platform 30. Mounted within blower shaft 37 are a pair of electrical strip heaters 38. At the bottom of blower shaft 37 on the floor of cabinet 10 is mounted an electrical blower fan 39.

The portion of cabinet 10 which faces the user is provided with a metal door 40, which is mounted on hinges and which provides access to the blower compartment 35. Directly above door 40 is a switch panel 41 on which are mounted the switches and indicator lights necessary for the electrical operation of my device. The portion of cabinet 10 which faces the user is provided with a pair of storage doors 42 and 43, which are mounted on hinges and swing outwardly to permit access to storage compartment 36. Mounted within storage compartment 36 on the inside of cabinet 10 and metal plate 34 are brackets 44 and 45 and brackets 46 and 47. On these pairs of brackets are slideably mounted storage trays 48 and 49 respectively, which are perforated metal sheets or wire trays. Storage trays 48 and 49 are adapted to hold boxes filled with popcorn.

Directly above storage trays 48 and 49 within storage compartment 36 is a money drawer 51, which is slideably mounted in an enclosed drawer portion 52 so that it is separated from storage compartment 36.

Two corners of platform 30 are provided with openings surrounding which are mounted metal collars 53 and 54. Collars 53 and 54 surround and hold in place a pair of hollow glass tubes 55 and 56, which extend upwardly to a point just short of the top 11 of cabinet 10, and which extend downwardly into blower compartment 35 and storage compartment 36 respectively. Across the tops of glass tubes 55 and 56 are fastened a pair of round metal screens 57 and 58 of sufficiently fine mesh to prevent the entry of kernels of popcorn into glass tubes 55 and 56.

Removably mounted in the upper portion of cabinet 10 is a metal baffle plate 50. Baffle 50 is provided with small perforations, which are enlarged in Fig. 3 for purposes of illustration. Baffle plate 50 normally rests by gravity against upper section 20 of cabinet 10, extending downwardly at an angle of approximately forty five degrees from vertical. Baffle plate 50 extends only part way to platform 30, and has at its ends arms 59, which contact platform 30. Arms 59 are adapted to slide along platform 30 to a point where further movement is prevented by a pair of stops 60.

In the upper portion of cabinet 10 is mounted a tubular fluorescent light bulb 62, with a conventional starting ballast 63, provididing light for the contents of the upper portion of cabinet 10.

Switch panel 41 contains the electrical controls and indicators which are shown in Fig. 4. Snap switch 65 controls the fluorescent light bulb 62 and ballast 63. Snap switch 66 controls the motor of blower fan 39 and switches 67 and 68 control the strip heaters 38. In the circuits of blower fan 39 and heaters 38 are included indicator lights 69, 70 and 71 respectively, which glow when their respective circuits are closed. Included in the circuit of one heating element is a thermostat 72, which is adapted to open the heater circuit when too great a temperature has been reached inside cabinet 10.

In operation, the user of my device receives popcorn which has already been cooked, but which is cold. The user raises cover half 12 or 13 and pours the contents of one or more bags of popcorn onto tray 33. Cover half 12 or 13 is then replaced in position. All of the snap switches 65, 66, 67 and 68 are then turned on. At this time indicator lights 69, 70 and 71 should glow to indicate that blower fan 39 and strip heaters 38 are in operation.

The operation of blower fan 39 causes air to be propelled away from it through blower shaft 37, past strip heaters 38. The air becomes heated as it passes strip heaters 38 and then moves out opening 31 in platform 30. It is there deflected by cover 32 to move beneath tray 33. The heated air passes upwardly through the perforations of tray 33 and then mingles with and passes through the popcorn which has been placed on tray 33.

Driven onward by successding drafts of air, it moves up toward top 11 of cabinet 10. The withdrawal of air from blower compartment 35 and storage compartment 36 has, in the meantime, created suction which causes air to be drawn into glass tubes 55 and 56, where it passes downwardly into blower compartment 35 and storage compartment 36. Since the ends of glass tubes 55 and 56 are near top 11 of cabinet 10, the heated air is drawn into tubes 55 and 56.

The air which passes into storage compartment 35 is immediately drawn toward blower fan 39, while the heated air which passes into storage compartment 36 passes through the openings in storage trays 48 and 49 and circulates around storage compartment 36. This air is then drawn through the openings in metal plate 34 into blower compartment 35 and toward blower fan 39, where it begins a new cycle of circulation. The circulation of heated air is a continuous operation, in which the air is constantly heated and blown past the popcorn in tray 33 and past the contents of storage compartment 36.

After a period of approximately one-half hour, the popcorn becomes sufficiently warm so that only one of the strip heaters 38 is necessary. Switch 67 is then turned off, leaving in operation only the heater in the circuit of which is included thermostat 72. If the heat becomes too intense, thermostat 72 cuts off the remaining heater.

After the popcorn has become warm, it is ready for boxing. Hand knob 23 is used to open lower portion 21 so that it swings toward the user, providing access to the popcorn. Through the use of a metal scoop, boxes may be filled with popcorn and placed on storage trays 48 and 49 in storage compartment 36. Baffle plate 57 prevents the popcorn from flowing out the opening provided by the movement of lower portion 21. The filled boxes of popcorn are kept warm by the circulation of heated air through storage compartment 36. If desired, empty boxes may also be kept in storage compartment 36 for heating prior to filling.

In operation, my device makes it possible for an unskilled operator to dispense large quantities of popcorn in its most appetizing form. Warm popcorn is always available without any of the inconveniences of the cooking operation.

It is within the contemplation of my invention that a double unit of the embodiment shown may be provided for use where one is not sufficient to meet a particularly heavy demand.

Having thus described my invention, I claim:

1. A popcorn warming device comprising a cabinet having an upper display portion composed of transparent materials and adapted to hold and display popcorn therein, the top of said cabinet having a removable cover, a tray positioned within said cabinet beneath its upper display portion and adapted to hold loose popcorn, said tray having perforations sufficiently large to permit the passage of air through said tray and sufficiently small to prevent the passage of popcorn through said tray, a door comprising a portion of one side of said cabinet adjacent said tray, said door adapted to open outwardly to provide access to the popcorn on said tray, a metal plate positioned within the lower portion of said cabinet beneath said tray to divide said cabinet into a blower compartment and a storage compartment, said metal plate having perforations sufficiently large to permit air to flow from said storage compartment to said blower compartment, a blower shaft mounted on said metal plate within said blower compartment, said blower shaft having an opening beneath said tray, a pair of electrical strip heaters mounted within said blower shaft, a blower fan mounted on the floor of said storage compartment beneath said blower shaft, storage trays positioned within said storage compartment and adapted to hold boxes filled with popcorn, said trays having perforations sufficiently large to permit air to pass through said trays, a pair of glass tubes positioned in the corners of the upper portion of said cabinet, one of the ends of said tubes being near the cover of said cabinet and the other ends of said tubes extending into said blower compartment and said storage compartment, said blower fan adapted to blow air through said blower shaft past said heaters, where the air is heated, to blow the heated air beneath said tray, through said tray and the popcorn on said tray, through said glass tubes into said blower compartment and storage compartment and past the filled popcorn boxes on said storage trays into said blower compartment to said blower fan to complete the cycle, and means for connecting said blower fan and heaters to a suitable source of electrical sppply.

2. A popcorn warming device comprising a cabinet having an upper display portion composed of transparent materials and adapted to hold and display popcorn therein, a tray positioned within said cabinet adjacent said upper display portion and adapted to hold loose popcorn, said tray having perforations sufficiently large to permit the passage of air through said tray and sufficiently small to prevent the passage of popcorn through said tray, the upper display portion of said cabinet having an opening adapted to permit access to said tray, a blower shaft positioned beneath said tray, a pair of electrical strip heaters mounted within said blower shaft, a blower fan positioned beneath said blower shaft and connected thereto, said cabinet adapted to hold in its lower portion beneath said tray filled boxes of popcorn, duct means extending from the upper part of the upper portion into the lower portion of said cabinet for the circulation of air therebetween, said blower fan adapted to blow air through said blower shaft past said heaters, where said air is heated, and to blow the heated air beneath said tray, through said tray and the popcorn on said tray, then from the upper portion of said cabinet through said duct means into the lower portion of said cabinet past the filled boxes of popcorn through said blower fan to complete the cycle, and means for connecting said blower fan and heaters to a suitable source of electrical supply.

SAMUEL NEWBURGER.

REFERENCES CITED

The following references are of record in the file of this patent:

UNITED STATES PATENTS

| Number | Name | Date |
| --- | --- | --- |
| 1,458,127 | Brown | June 12, 1923 |
| 1,800,863 | Johnson | Apr. 14, 1931 |
| 1,943,575 | Abendroth | Jan. 16, 1934 |
| 1,973,347 | Kelly | Sept. 11, 1934 |